Feb. 11, 1969   C. J. JACOBSON   3,426,724
POWER-DRIVEN AQUATIC VEHICLE
Filed Feb. 19, 1968
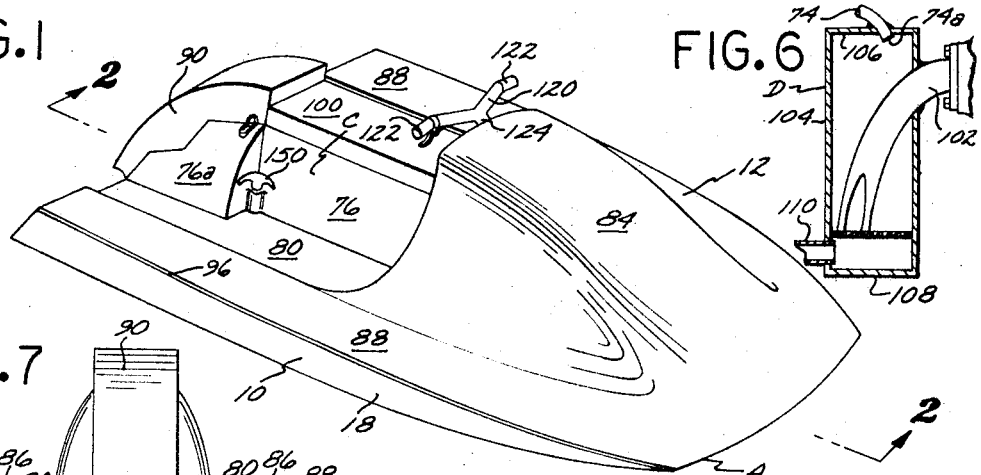
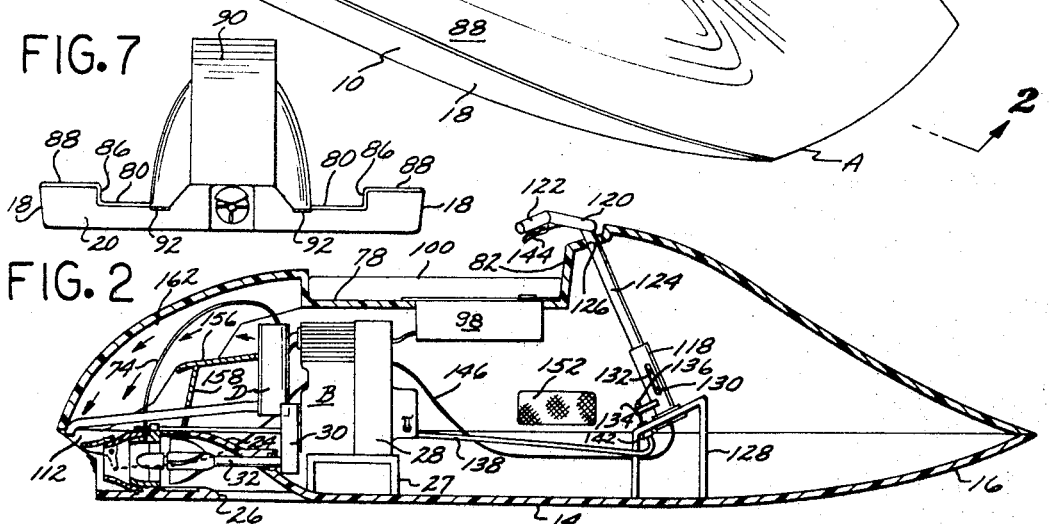
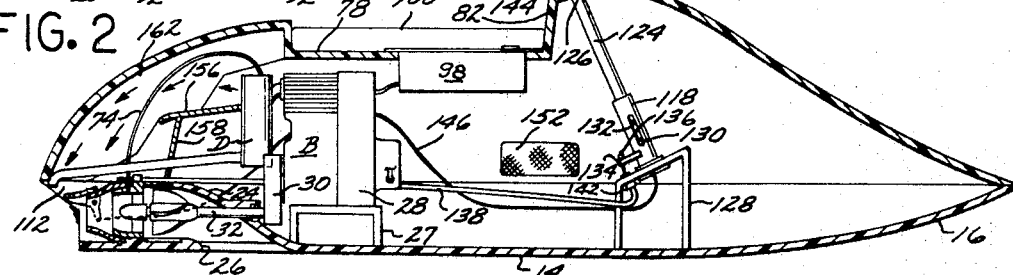
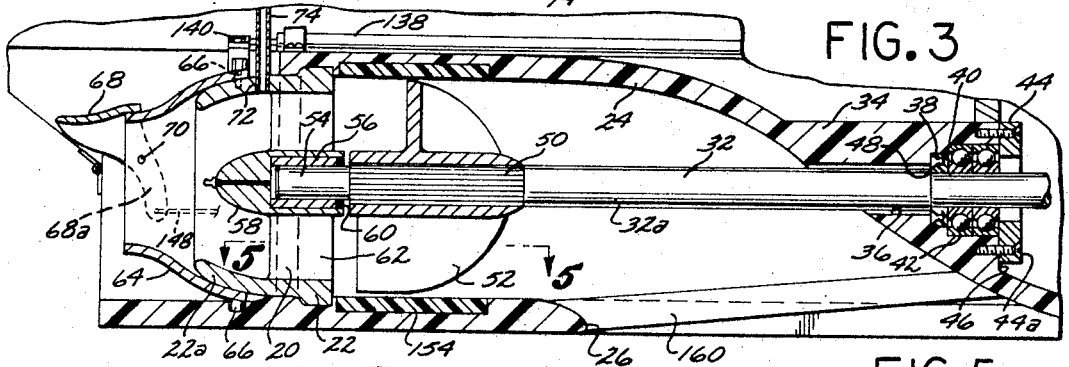
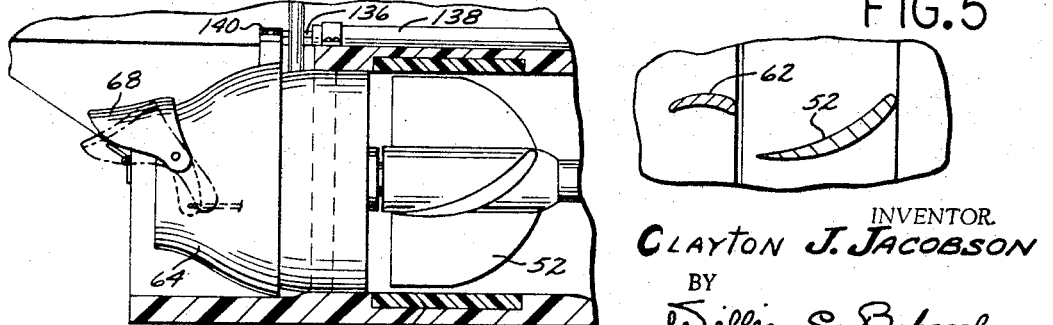
INVENTOR.
CLAYTON J. JACOBSON
BY
William G. Babcock
ATTORNEY United States Patent Office 3,426,724
Patented Feb. 11, 1969

3,426,724
POWER-DRIVEN AQUATIC VEHICLE
Clayton J. Jacobson, 5403 Seacrest,
Rolling Hills, Calif. 90274
Filed Feb. 19, 1968, Ser. No. 706,393
U.S. Cl. 115—70                    10 Claims
Int. Cl. A63h 5/08, 15/00; B63h 11/00

ABSTRACT OF THE DISCLOSURE

A low draft aquatic vehicle that is power-driven by a jet of water, the direction of which may be varied at will by the operator when seated at the controls of the vehicle to regulate the direction of travel thereof.

BACKGROUND OF THE INVENTION

Field of the invention

A power-driven aquatic vehicle that may be operated in but inches of water, which vehicle is of such configuration that an operator may stand in an upright position on any portion thereof without danger of overturning the vehicle.

Description of the prior art

Various types of power-driven aquatic vehicles have been devised in the past that were of ski or sled-like structure and used by an operator when in a standing position. Such sleds were stable in the water only when operated at relatively high speed by an operator of a high degree of skill.

The present invention overcomes the operational disadvantages of previously available aquatic vehicles in that it may be satisfactorily operated by a person having little or no experiences in operating such devices, and one that cannot be inadvertently upset in the water when the operator thereof is standing in an upright position on any portion thereof.

Furthermore, the present invention is safe to use in waters frequented by swimmers, for the power-driven propeller thereof that generates the driving jet of water is completely shielded against possible bodily contact with those swimming or floating in the body of water wherein the vehicle is operated.

SUMMARY OF THE INVENTION

A low draft power-driven aquatic vehicle that supports the operator when in a seated position, and one which while capable of traveling at a substantial speed, is stable both at a low speed and when stationary to the extent that the operator may stand in an upright position on any portion thereof without upsetting the same.

A major object of the invention is to provide an aquatic vehicle that is of simple structure and relatively inexpensive to manufacture, can be fabricated from standard, commercially available materials, is safe to use in waters frequented by swimmers, and is driven by a rearwardly directed jet of water, the direction of which may be varied at the will of the operator to not only guide the craft, but to control the manner in which it planes in the water.

Another object of the invention is to supply an aquatic vehicle in which the power-driven propeller will not be damaged due to coming into contact with pebbles, small rocks, or the like, that are carried rearwardly with water forming the driving jet, and which vehicle will not be damaged, even if driven onto shore or a sandbar.

A further object of the invention is to provide an aquatic vehicle in which the internal combustion engine that actuates the driving propeller is concealed within the hull thereof whereby the exhaust gases from the engine are discharged through a water-cooled muffler and minimizes heating of the hull interior.

DESCRIPTION OF THE DRAWING

FIGURE 1 is a perspective view of the power-driven aquatic vehicle;

FIGURE 2 is a longitudinal, cross-sectional view of the vehicle, taken on the line 2—2 of FIGURE 1;

FIGURE 3 is an enlarged longitudinal cross-sectional view of the lower rear portion of the vehicle;

FIGURE 4 is a combined side elevational and longitudinal, cross-sectional view of the lower rear portion of the vehicle;

FIGURE 5 is a fragmentary, transverse, cross-sectional view of the aquatic vehicle, taken on the line 5—5 of FIGURE 3;

FIGURE 6 is a longitudinal, cross-sectional view of the water-cooled muffler; and FIGURE 7 is a rear elevational view of the vehicle.

DESCRIPTION OF THE PREFERRED EMBODIMENT

In FIGURES 1, 2 and 3 it will be seen that the aquatic vehicle A of the present invention includes a hollow hull defined by a lower portion 10 and upper portion 12. The hull portions 10 and 12 may be formed from any selected sheet material that is corrosion resistant, either as to the physical characteristics thereof, or when coated with a film of protective material. From experience, fiber glass has been found to be a most suitable material for use in the formation of the hull portions 10 and 12.

Lower portion 10 includes a generally flat bottom 14 of substantial width, and terminates in an upwardly curving forward section 16. Two side walls 18 and an end wall or transom extend upwardly from the bottom 14.

At the center thereof, the end wall 20 supports a longitudinally aligned tubular member 22 (FIGURE 5) in which passage-defining means 24 extends forwardly therefrom to an opening 26 provided in the bottom 14. Water on which the vehicle floats may flow rearwardly through opening 26, passage means 24, and tubular member 22 to discharge from the latter for reasons to be later explained.

Adjacent the passage-defining means 24 and on the upper surface thereof, the bottom is provided with a transverse mounting 27, as shown in FIGURE 2, that serves to support an internal combustion engine assembly B in a fixed position relative to lower hull portion 10. The assembly B preferably includes an air cooled internal combustion engine 28 and a centrifugal clutch unit 30 connected to a rearwardly extending drive shaft 32.

A block 34 extends forwardly from the forward portion of passage-defining means 24, as illustrated in FIGURE 3. A longitudinally extending opening 36 is provided in block 34 that is in communication with a sealing ring 38 and thrust bearings 40 positioned in a recessed part 42 of the block. A ring 44 is removably secured to the forward face 46 of block 34 by screws 44a and serves to hold the sealing ring 38 and thrust bearings 40 in the recessed part 42 as shown in FIGURE 3. Passage-defining means 24 may be either an integral part of lower hull portion 10 or a separate unit secured thereto by conventional means.

A circumferentially extending body shoulder 48 is defined on shaft 32 that is in abutting contact with sealing ring 44 (FIGURE 3). That portion 32a of shaft 32 rearwardly of shoulder 48 is larger in diameter than the shaft portion 32b forwardly of the shoulder. Shaft portion 32a is provided with a rear splined section 50 that serves as a mounting for a propeller 52, and a shaft extension 54 projects rearwardly from shaft portion 32a. Shaft extension 54 is rotatably supported in a brass bushing 56 or other suitable means is disposed in a horizontal cup-shaped member 58. The forward part of member 58 is closed by a sealing ring 60 that slidably engages shaft extension 54. A number of circumferentially spaced anti-torque vanes 62 of curved transverse cross section (FIGURE 5) extend radially from member 58 to tubular member 22 to which they are secured.

Member 22 extends rearwardly from the end wall 20, as shown in FIGURES 3 and 4, and has an inwardly and rearwardly tapering rear portion 22a on which a turbular nozzle 64 is pivotally supported by pins or bolts 66 to permit movement in a horizontal direction. The rear extremity of nozzle 64 is preferably of lesser transverse cross section than that of the forward portion of the nozzle to increase the velocity of a jet-like stream of water which discharges from the nozzle.

Should it be desired, a U-shaped deflector plate 68 may be pivotally supported on the upper rear portion of the nozzle 64 by pins 70, or the like. A bore 72 is formed in member 22, in which bore one end of a tube 74 is disposed. As the propeller 52 is actuated, a portion of the water in tubular member 22 is discharged outwardly therefrom into tube 74 for a purpose that will be explained hereinafter.

The upper hull portion 12 (FIGURE 1) includes a centrally disposed, longitudinally extending seat C defined by two laterally spaced side walls 76 and a top 78. The rear edges of side walls 76 develop into extensions 76a which project outwardly and rearwardly. The lower edges of side walls 76 and side wall extensions 76a develop into two laterally spaced, longitudinally extending platforms 80.

The forward edges of side walls 76, top 78 and platforms 80 merge into an upwardly extending wall 82, and a hood 84 extends forwardly from this wall in the manner shown in FIGURE 1. The outer edges of platforms 80 develop into longitudinally extending walls 86, which walls in turn merge at the upper edges thereof into platform extensions 88 that proceed forwardly and merge with hood 84.

A cover 90 is provided, which when in an open position, permits access to the engine 28 and is pivotally supported between side wall extensions 76a as illustrated in FIGURES 2, 3 and 4. Hinges 92 secured to cover 90 and rear extremities of platforms 80 serve to pivotally support the cover from the latter. Locks 94 of a conventional design shown in FIGURE 1 are so disposed relative to cover 90 and side wall extensions 78 as to removably maintain the cover in the closed position. The upper and lower hull portions 10 and 12 are bonded together at their abutting edges 96 by an epoxy adhesive, or the like.

Fuel for engine 28 is stored in a tank 98 that depends from the top 78 shown in FIGURE 2 and disposed within the seat C. A cushion 100 is preferably mounted on the upper portion of seat C on which the operator (not shown) sits, with his legs astraddle the seat and his feet resting on the platforms 80.

An exhaust pipe 102 extends rearwardly from engine 28 into a muffler D, best seen in FIGURES 2 and 6. Muffler D includes a vertically disposed cylindrical shell 104 having closed upper and lower ends 106 and 108, respectively. A second exhaust pipe 110 extends from the lower interior of shell 104 to a space 112 defined between the lower, rear extremity of cover 90 and end wall 20, as shown in FIGURE 2. An end portion 72a of tube 74 extends through an opening in shell end 106.

When propeller 52 is rotating, water is discharged through tube 74 into confined space 112. A transverse plate 114 is secured to the interior of shell 104 above second exhaust pipe 110, and a number of spaced openings 116 are formed in this plate that serve to reduce the noise of the exhaust from pipe 102 as the exhaust discharges into the muffler D. Water entering the muffler D cools not only the exhaust gases but the shell 104 whereby no substantial heating of the interior of hull A occurs during operation of engine B. Water in space 112 that is heated by the exhaust gases is discharged therefrom through the second exhaust pipe 110.

Guidance of the aquatic vehicle A is accomplished by the operator (not shown) thereof who manipulates a crossbar 120 provided with two laterally spaced grips 122 on each end thereof. Crossbar 120 is mounted on the upper end of a shaft 124 that extends downwardly and forwardly through an opening 126 formed in wall 82.

The lower end of shaft 124 is slidably disposed in a tube 118 that is rotatably supported in a conventional manner on the upper portion of a bracket 128. Bracket 128 is secured to the forward interior upper surface of bottom 14, as shown in FIGURE 2. A pin 130 projects outwardly from shaft 124 and slidably engages a longitudinally extending slot 132 in tube 118. A lug 134 projects from tube 118, and this lug is secured to one end of a stiff, resilient, elongate member 136 such as a choke cable, which is slidably movable in a tubular guide 138. Guide 138 is located within hull A and extends rearwardly to tubular member 22 to which it is affixed. The rear end of member 136 is secured to an off-centered leg 140 that projects outwardly from nozzle 64. The forward end of guide 138 is secured to bracket 128 by conventional fastening means 142, as shown in FIGURE 2.

A pivotal lever 144 is mounted on crossbar 120 (FIGURES 1 and 2), and may be manipulated to move a cable 146 extending downwardly through shaft 124 and tube 126 to the carburetor (not shown) of engine 28. The speed at which engine 28 operates and propeller 52 is driven is controlled by lever 144. A stiff cable 148 is affixed to a downwardly projecting portion 68a on one side of deflector plate 68, with the cable extending forwardly to a manually operable control (not shown) that is sufficiently close to seat C to permit actuation thereof by an operator (not shown) when astride the seat. Engine 28 is started by means of a pull cord (not shown) provided with a handle 150 that normally occupies the position shown in FIGURE 1. Air for operation of engine 28 is admitted into the interior of hull A through screened openings 152 which may be located at any selected position therein, so long as they are a substantial distance above the waterline of the vehicle.

A cylindrical shell 154 of elastomeric material and of substantial thickness is supported in that portion of the passage-defining means 24 surrounding propeller 52. Pebbles, small rocks and other hard, foreign objects which may be carried with water as it passes through the passage-defining means 24 will not damage propeller 52, for the shell 154 will deform sufficiently to permit such objects to pass between it and the propeller.

Use and operation of the aquatic vehicle A are most simple. The operator (not shown) assumes a position astride seat C, and starts engine 28 by pulling upwardly on handle 150. Lever 144 is then manipulated to speed up engine 28 and drive propeller 52 at a desired rate. Propeller 52 discharges a jet of water rearwardly from nozzle 64 and causes the vehicle to move forwardly.

Rotation of propeller 52 also causes water to pass through tube 74 to muffler D to cool exhaust gases discharging thereinto. The exhaust gases are cooled to the extent that the muffler D may be touched without danger, even after engine 28 has operated over a prolonged period of time.

Two transverse baffles 156 and 158 extend between side wall extensions 76a, as shown in FIGURE 2, which prevent water that may slosh through space 112 from contacting engine B. If during operation of the vehicle A the deflector 68 is moved from the position shown in solid line in FIGURE 4 to the position illustrated in phantom line in the same figure, the direction of the jet of water is varied vertically to cause the vehicle to plane at an increased degree as it moves through the water. Due to the curved transverse cross section thereof, vanes 62 cause the column of water being discharged rearwardly to nozzle 64 to flow longitudinally without substantial rotation. The width of the lower hull portions 10 and 12 is sufficiently great that it is possible for a person to stand in an upright position on the vehicle without overturning the same. Should it be desired, laterally spaced, longitudinally extending bars 160 may be provided to extend across opening 26 to not only prevent entrance of debris into passage-defining means 24, but prevent a person from placing his hand into opening 26 while the propeller is in operation. The vanes 62 make it impossible for a person to extend his hand through the nozzle 64 to contact propeller 52 when it is rotating.

It will be noted in FIGURE 2 that the fan 28a of the engine 28 discharges a stream of air heated by the engine rearwardly through the hull of vehicle A from which it discharges through the space 112. The path of the heated air is indicated by a sequence of arrows 162 shown in FIGURE 2. Due to this constant discharge of air from the vehicle A, the interior thereof remains at a relatively low temperature. The cooled exhaust gases from the second exhaust pipe 110 also discharge into the ambient atmosphere through space 112. Crossbar 120 may be raised and lowered to permit the operator of vehicle A to operate the same in either a seated or standing position.

I claim:

1. A low draft aquatic vehicle that occupies a stable floating position on a body of water whether it is in motion or stationary, comprising:
    (a) an elongate hollow hull of sufficient width as to not overturn when an operator stands in an upright position on any portion thereof, which hull includes a top portion that defines an elongate longitudinally extending seat and a lower portion which includes a substantially flat bottom and a rear end wall extending upwardly therefrom, with said end wall and upper portion cooperatively defining a first opening in communication with the interior of said hull;
    (b) a longitudinally positioned tubular member disposed in substantially the center of said end wall and projecting rearwardly therefrom;
    (c) a nozzle pivotally supported for movement in a horizontal direction from said rearwardly projecting portion of said tubular member;
    (d) passage-defining means extending forwardly from said tubular member to a second opening formed in said bottom;
    (e) an internal combustion engine assembly positioned within said hull forwardly of said second opening in said bottom, with said assembly including a fan, first exhaust pipe and a rearwardly extending drive shaft that extends through an opening provided in said passage-defining means;
    (f) a propeller situated in said passage-defining means connected to said shaft and driven thereby;
    (g) manually operable guide means for pivoting said nozzle when an operator is astride said seat;
    (h) a muffler within said hull connected to said first exhaust pipe;
    (i) a second exhaust pipe extending from said muffler to the ambient atmosphere; and
    (j) first means for discharging water into said muffler to cool said muffler exhaust gases and said second exhaust pipe to prevent heating of said seat during operation of said vehicle, with the interior of said hull being further cooled by said fan as it draws air through at least one opening in said hull above the waterline thereof and discharges said air after being heated through said hull, and with said vehicle being both driven and guided by a jet of water discharged rearwardly from said pivotally supported nozzle as said propeller is rotated by said engine assembly.

2. An aquatic vehicle as defined in claim 1 wherein said passage-defining means comprises a tube in communication with the interior of said tubular member that receives water under pressure as said propeller is rotated, and discharges said water into the interior of said muffler.

3. An aquatic vehicle as defined in claim 2 wherein said muffler further includes:
    (k) a cylindrical shell on which end pieces are mounted to define a confined space therebetween, with said first and second exhaust pipes and said tube being in communication with said confined space; and
    (l) a transverse plate in said shell disposed between the connections of said first and second exhaust pipes, with said plate having a plurality of spaced openings formed therein of such size as to quiet the discharge of the exhaust from said engine assembly as said exhaust passes through said confined space.

4. An aquatic vehicle as defined in claim 1 which further includes:
    (k) bearing means disposed in said tubular member that rotatably support a rear portion of said shaft; and
    (l) a plurality of circumferentially spaced, radially extending anti-torque vanes in said tubular member which maintain said bearing means at a fixed position therein.

5. An aquatic vehicle as defined in claim 1 which further includes:
    (k) thrust bearing means held in a fixed position relative to said hull for preventing forward movement of said shaft as said propeller is driven by said engine assembly.

6. An aquatic vehicle as defined in claim 1 which further includes:
    (k) a tubular shell of an elastomeric material supported in said passage-defining means and surrounding said propeller, which shell is of substantial thickness and deforms when a hard foreign object passes rearwardly between said shell and propeller to minimize the possibility of damage to said propeller caused by said object.

7. An aquatic vehicle as defined in claim 1 which further includes:
    (k) a deflector pivotally supported for vertical movement on the upper rear portion of said nozzle; and
    (l) means for adjustably moving said deflector into said jet to direct said jet downwardly and cause said hull to plane as said hull moves on a body of water.

8. An aquatic vehicle as defined in claim 1 wherein said upper portion of said hull forwardly of said seat is shaped to define a hood, with said upper portion on each side of said seat including a longitudinally extending platform and said guide means, which vehicle further includes:
    (k) an upwardly extending shaft pivotally supported in said upper hull portion forwardly of said seat;
    (l) a lug operatively associated with said shaft;
    (m) means connected to said lug and said nozzle for pivoting said nozzle as said shaft is rotated; and
    (n) handle means for rotating said shaft.

9. An aquatic vehicle as defined in claim 8 wherein said shaft is vertically movable relative to said hull to permit said handle means to be disposed at a desired elevation relative to said hull.

10. an aquatic vehicle, comprising:
    (a) a hollow low draft hull having a substantially flat bottom from which a transom and side walls extend upwardly, which bottom includes a curved, upwardly extending bow that develops into an upwardly and rearwardly extending hood-like portion situated above said side walls, two laterally spaced, longitudinally extending, horizontal platforms which merge with the upper edges of said side walls and transom, with said platforms at their adjacent edges developing into an upwardly extending seat on which an operator is supported in an astride position and with an opening formed in the rear portion of said bottom that is in communication with a centrally disposed rearwardly extending passage defined in said hull, with the forward portion of said seat developing into a transverse wall structure that merges with the rear edges of said hood-like portion;

(b) an internal combustion engine assembly disposed within said hull, which assembly includes a rearwardly extending drive shaft that extends through an opening in that portion of said hull defining said passage, an exhaust tube extending rearwardly from said engine in said assembly, and fuel supply means in said hull for said engine, with said engine being supplied with air from the ambient atmosphere for the operation thereof through openings formed in said hull;

(c) a propeller mounted on the rear portion of said drive shaft and situated in said passage;

(d) resilient means in said passage extending around said propeller and are circumferentially spaced therefrom for permitting foreign objects to move rearwardly between said propeller and resilient means when said propeller is rotating without doing damage thereto;

(e) a rigid tubular member in the rear portion of said passage and longitudinally aligned relative to said hull;

(f) a nozzle pivotally supported for transverse movement from the rear portion of said tubular member;

(g) a deflector pivotally supported for vertical movement from the rear portion of said nozzle; and (h) manually operable means supported from said hull adjacent said seat for controlling the speed of said engine, for pivoting said nozzle to guide said hull as a jet of water discharges rearwardly therethrough as said propeller is driven by said engine, and for pivoting said deflector relative to said jet to control the plane of said hull.

References Cited

UNITED STATES PATENTS

| | | | |
|---|---|---|---|
| 3,324,822 | 6/1967 | Carter | 115—70 |
| 3,339,514 | 9/1967 | Skuce | 115—70 X |

MILTON BUCHLER, *Primary Examiner.*

T. M. BLIX, *Assistant Examiner.*

U.S. Cl. X.R.

115—12